United States Patent Office 3,549,578
Patented Dec. 22, 1970

3,549,578
FREEZE-THAW RESISTANT POLYVINYL ESTER DISPERSIONS AND PROCESS FOR MAKING THEM
Werner Ehmann, Frankfurt am Main, Germany, assignor to Farbwerke Hoechst Aktiengesellschaft vormals Meister Lucius & Bruning, Frankfurt am Main, Germany, a corporation of Germany
No Drawing. Filed July 2, 1968, Ser. No. 741,841
Claims priority, application Germany, July 8, 1967, F 52,899; July 21, 1967, F 53,022
Int. Cl. C08f 1/63, 4/24
U.S. Cl. 260—29.6                          14 Claims

ABSTRACT OF THE DISCLOSURE

The present invention provides freeze-thaw resistant aqueous dispersions of polyvinyl esters or copolymers of vinyl esters using as protective colloid a graft polymer of a vinyl sulfonate onto a water-soluble polyvinyl alcohol derivative which is added to the polymerization batch or formed therein after the polymerization of the monomers, and a process for the manufacture of the said dispersions.

The present invention relates to freeze-thaw resistant aqueous dispersions of polyvinyl esters or copolymers of vinyl esters and to a process for making them.

It has been proposed to produce aqueous polyvinyl ester dispersions in the presence of polyvinyl alcohol. The said dispersions are, however, not freeze-resistant unless a relatively high amount of polyvinyl alcohol is used. After cooling to 0 to $-5°$ C. and thawing again a considerable increase of the latex viscosity is observed, even coagulation often may occur. If, however, very large amounts of polyvinyl alcohol are used, the dispersions have no brushing or spreading properties.

Still further, it has been proposed to copolymerize vinyl acetate with vinyl sulfonate to produce polyvinyl ester dispersions. Dispersions of this kind are unsuitable for many fields of application, for example for glues and adhesives, which require the presence of polyvinyl alcohol.

According to another proposal polyvinyl ester dispersions are produced with the use of vinyl sulfonate as comonomer and with soap-like emulsifiers. In this case, finely disperse dispersions are obtained which are unsuitable for certain purposes of adhesion and have a poor freeze-thaw resistance.

It has furthermore been proposed to produce stable dispersions by the use of a polyvinyl alcohol which has been pretreated with sulfurizing agents. Very finely dispersen and quite stable dispersions are obtained in this manner but their freeze-thaw resistance is not good enough as is the case with all fine dispersions having fine particles.

Finally, according to a further proposal freeze-thaw resistant polyvinyl acetate dispersions are produced in a complicated two stage process by preparing in the first stage, in the presence of polyvinyl alcohol, a pasty dispersion of high solids content that is difficult to handle and diluting the said dispersion in a second stage with aqueous polyvinyl alcohol solution. In this process during polymerization the stabilizing action of only a part of the used polyvinyl alcohol is utilized.

The present invention provides aqueous dispersions of polyvinyl esters or copolymers of vinyl esters, possibly with other ethylenically unsaturated compounds using polyvinyl alcohol derivatives as protective colloids, which dispersions contain as protective colloids a graft polymer of a vinyl sulfonate on a water-soluble polyvinyl alcohol derivative.

The present invention also provides a process for the manufacture of aqueous dispersions of polyvinyl esters or copolymers of vinyl esters by polymerizing vinyl esters, possibly together with other ethylenically unsaturated compounds, in aqueous emulsion in the presence of free radical polymerization catalysts and polyvinyl alcohol derivatives as protective colloids, which comprises polymerizing vinyl esters, possibly together with other ethylenically unsaturated compounds in aqueous emulsion in the presence of a protective colloid prepared by graft-polymerizing a vinyl sulfonate onto a water-soluble polyvinyl alcohol derivative.

It is surprising that the process of the invention yields vinyl ester dispersions having a very good freeze-thaw resistance. Dispersions having this advantageous property cannot be produced, for example, by using a mixture of a polyvinyl alcohol derivative and the homopolymer of the vinyl sulfonate instead of the graft polymer of the invention. A vinyl estervinyl sulfonate copolymerization is not successful either. Neither does blending of a graft polymer of a polyvinyl alcohol derivative and vinyl sulfonate with a polyvinyl ester dispersion yield a freeze-thaw resistant dispersion.

By polyvinyl ester dispersions there are to be understood aqueous dispersions containing 30 to 60 and preferably 40 to 55% by weight of polymeric vinyl ester of a carboxylic acid having 2 to 18 carbon atoms, such as polyvinyl stearate, polyvinyl laurate, polyvinyl butyrate, polyvinyl isobutyrate, polyvinyl versatate, polyvinyl pivalate, polyvinyl propionate; polyvinyl esters of isononanoic acid and isooctanoic acid; and advantageously polyvinyl acetate. The dispersions may also contain copolymers of the aforesaid vinyl esters. The vinyl ester polymer can also be a copolymer of one or several vinyl esters with up to 20%, preferably up to 10% by weight, calculated on the vinyl ester(s) of other compounds copolymerizable with vinyl esters, for example acrylic acid esters, preferably an ester of acrylic acid with a monohydric saturated aliphatic alcohol having up to 10 carbon atoms, maleic acid esters, preferably an ester of maleic acid with a monohydric saturated aliphatic alcohol having up to 10 carbon atoms or vinyl chloride.

The graft copolymers can be produced in any manner known for this purpose. They are advantageously prepared, however, by graft-polymerizing an ethene sulfonate, preferably sodium ethene sulfonate, in an aqueous solution of the polyvinyl alcohol derivative in the presence of water-soluble catalysts that decompose to yield free radicals or produce free radicals, for example hydrogen peroxide, redox systems or preferably persulfates, at a temperature in the range of from 10 to 90 and preferably 25 to 70° C. It is advatnageous to operate in the atmosphere of an inert gas.

The graft polymer is obtained by polymerizing 1 to 300, preferably 2 to 100 and more, preferably 3 to 30 parts by weight of vinyl sulfonate, calculated on the water-soluble polyvinyl alcohol derivative. The amount of graft polymer present in the dispersion according to the invention ranges from 1 to 20, preferably 3 to 12% by weight, calculated on the vinyl ester homo- or copolymer.

Suitable polyvinyl alcohol derivatives to be used in the manufacture of the graft polymers are hydrolysis products of polyvinyl esters, of copolymers essentially consisting of polyvinyl esters, preferably of polyvinyl acetate; moreover hydrolysis products of graft polymers of vinyl esters, advantageously vinyl acetate, on polyalkylene oxides or on polymeric N-vinyl-N-alkyl-carboxylic acid amides.

The hydrolysis products still contain up to about 50, preferably up to 35 and more, preferably 2 to 22 mole percent of acyl groups. The hydroxyl groups of the hydrolysis products may wholly or partially be acetalized, for example by aldehydes, especially by acetaldehyde and/or butyraldehyde.

In most cases it is not necessary to separate the graft polymers to be used according to the invention after their preparation from the ungrafted polyvinyl alcohol derivative or from the vinyl sulfonate homopolymer.

The aqueous medium used for the manufacture of the polyvinyl ester dispersion may contain, in addition to the graft polymer, other protective colloids, for example starch or cellulose derivatives, polyacrylamide, polymers of N-vinyl-N-alkyl-carboxylic acid amides or polyvinyl alcohol derivatives other than those already mentioned. The aqueous medium may furthermore contain ionic or non ionic emulsifiers such as alkyl, aryl, aralkyl sulfates or sulfonates, alkyl, aryl, arylalkyl polyethylene oxide ethers, polyalkylene oxides as well as block polymers from ethylene oxide and propylene oxide.

The graft polymers conferring on the dispersions a freeze-thaw resistance are added to the batch prior to or during the vinyl ester polymerization. It has proved advantageous to add at least part thereof prior to polymerization. It is possible, for example, to prepare in the polymerization vessel the graft polymer, to add further emulsifiers or protective colloids, if desired, and to use the said batch to produce the polyvinyl ester dispersion in known manner.

The polyvinyl ester dispersions are produced in known manner with the use of redox systems, hydrogen peroxide or persulfates as initiators. Depending on the initiator and monomer used, the polymerization temperature generally varies between 40 and 90° C. The monomer can be added to the batch all at once or during the course of polymerization.

An advantage of the invention is that the freeze-thaw resistant vinyl ester dispersions can be produced in a simpler manner than hitherto known. Moreover, the freeze-thaw resistant dispersions according to the invention contain a smaller proportion of polyvinyl alcohol or partially hydrolyzed polyvinyl esters.

A further advantage resides in the fact that the polymerization of the vinyl ester, also in admixture with another monomer, is more rapid in the presence of the polyvinyl alcohol/vinyl sulfonate graft polymer than by a known process in which the aqueous batch does not contain a graft polymer of this kind.

The specified graft polymers, furthermore, have the surprising advantageous effect largely to prevent the detrimental formation of foam often encountered with the use of polyvinyl alcohol derivatives.

The freeze-thaw resistant vinyl ester dispersions produced by the process of the invention are especially suitable for the manufacture of adhesives for wood and paper.

The following examples and comparative examples serve to illustrate the invention but are not intended to limit it thereto. They show the better freeze-thaw resistance of the polyvinyl ester dispersions containing the graft polymer according to the invention.

Comparative Examples 1 to 3 and Example 1 according to the invention were carried out as follows:

A multi-necked flask was used provided with a flat paddle stirrer, thermometer, reflux condenser and inlet tube for nitrogen dipping into the liquid, which flask was surrounded by a heating bath. The flask contained a solution of 120 grams of a polyvinyl alcohol derivative in 1980 grams of water, A 4% aqueous solution of the polyvinyl alcohol derivative had a viscosity of 20 centipoises. The derivative had been prepared by hydrolysis of polyvinyl acetate and contained 10 mole percent of acetyl groups.

COMPARATIVE EXAMPLE 1

(WITHOUT VINYL SULFONATE)

Nitrogen was passed for 30 minutes through the aqueous solution of the polyvinyl alcohol derivative, 1 gram of ammonium persulfate was added and the mixture was heated for 30 minutes at 60° C. The temperature was then raised to 75° C. and over a period of 3 hours 2 kilograms of vinyl acetate were added while stirring. The exothermic polymerization took first place at about 75° C., after 6 hours the temperature rose to 86° C.

The experiment was carried out two times. The dispersion obtained at first coagulated after freezing (−3° C.) and thawing. In the second experiment coagulation occurred during the course of polymerization.

COMPARATIVE EXAMPLE 2

(MIXTURE OF POLYVINYL ALCOHOL DERIVATIVE AND VINYL SULFONATE HOMOPOLYMER)

20 grams of poly-sodium vinyl sulfonate dissolved in 40 milliliters of water were added to the aqueous solution of the polyvinyl alcohol derivative. The experiment was continued as described in Comparative Example 1.

Two parallel experiments were carried out. In the first experiment a fine-grained product was obtained which could only be used as plastics dispersion under certain circumstances. The product obtained in the second experiment contained coagulated matter and was absolutely useless.

COMPARATIVE EXAMPLE 3

(VINYL ACETATE/VINYL SULFONATE COPOLYMERIZATION)

The aqueous solution of the polyvinyl alcohol derivative was blown out with nitrogen as in Comparative Example 1, 1 gram of ammonium persulfate was added, the mixture was heated for 30 minutes at 60° C., then at 75° C. 2 kilograms of vinyl acetate were added. When after about 20 minutes 200 grams of vinyl acetate had been added and polymerization has started, 60 grams of a 33% aqueous solution of sodium vinyl sulfonate were added. The prepolymerization of the vinyl acetate was carried out in order to favor the copolymerization of vinyl acetate with vinyl sulfonate over the grafting of vinyl sulfonate on the polyvinyl alcohol. The addition of the vinyl acetate was not interrupted and terminated within 3 hours. After 5 hours the polymerization temperature rose to 86° C.

In this case, too, two parallel experiments were carried out. In the first one a dispersion was obtained having a latex viscosity of 280 poises. After freezing at −20° C. and thawing the viscosity of the dispersion was 1200 poises. After thawing the second dispersion contained coagulated particles.

EXAMPLE 1

(ACCORDING TO THE INVENTION)

60 grams of a 33% aqueous solution of sodium vinyl sulfonate were added to the solution of the polyvinyl alcohol derivative and nitrogen was blown through for 30 minutes. 1 gram of ammonium persulfate was added. After heating for 30 minutes at 60° C. the temperature was increased to 75° C.

2 kilograms of vinyl acetate were added during the course of 3 hours at a polymerization temperature of 75–80° C. Near the end of polymerization after about 4 hours the temperature rose to 86° C.

In two parallel experiments there were obtained:
(a) A dispersion having a latex viscosity of 310 poises which, after cooling to −20° C. and defrosting, rose to 340 poises,
(b) A dispersion the viscosity of which did not change after freezing and thawing at the same temperature.

In further developing the process according to the invention for making aqueous dispersions of polyvinyl esters or copolymers of vinyl esters by polymerizing vinyl esters, if desired together with other ethylenically unsaturated compounds, in aqueous emulsion in the presence of free radical yielding compounds as catalysts, which dispersions contain a protective colloid perpared by graft-polymerizing a vinyl sulfonate on to a water-soluble polyvinyl alcohol derivative, it has been found that dispersions having excellent properties can also be obtained when the said graft polymer acting as protective colloid is prepared after the polymerization of the specified monomers in aqueous emulsion under the conditions set forth above by grafting a vinyl sulfonate on to a water-soluble polyvinyl alcohol derivative contained in the dispersion.

The following examples serve to illustrate this mode of operation. In Comparative Examples 4 to 8 and Examples 2 and 3 according to the invention the following experimental equipment was used:

A multi-necked flask provided with flat paddle stirrer, thermometer, reflux condenser and inlet tube for nitrogen dipping into the liquid. The flask was surrounded by a heating bath.

EXPERIMENT A

*Preparation of a polyvinyl ester dispersion (known method)*.—120 grams of a polyvinyl alcohol derivative dissolved in 1900 grams of water were introduced into the flask. The polyvinyl alcohol derivative had a viscosity of 25 centipoises in a 4% aqueous solution and contained 8 mole percent of acetyl groups. 1 gram of ammonium persulfate, 50 milligrams of cobalt acetate, 7.5 grams of 30% hydrogen peroxide and 100 grams of vinyl acetate were added to the solution. The mixture was emulsified by stirring (about 100 revolutions per minute) and simultaneously heated by means of the heating bath having a temperature of 75° C. When the polymerization had started, which could be perceived by the reduction of the foam initially formed and increase of the temperature above 68° C., 1900 grams of vinyl acetate were introduced over a period of 3 hours, while maintaining the bath temperature 3° C. above the internal temperature. After 3 hours the internal temperature rose to 85° C. 10 minutes after having reached this maximum temperature, 0.5 gram of potassium persulfate dissolved in 10 milliliters of water was added and the polymerization was completed within 1 hour at a bath temperature of 90° C. A polyvinyl acetate dispersion was obtained having a latex viscosity of 1300 poises. When a sample of the dispersion was frozen at −20° C. for one day and defrosted again, coagulation had occurred.

COMPARATIVE EXAMPLE 4 (WITHOUT VINYL SULFONATE)

500 grams of the dispersion according to experiment A were superposed with nitrogen and 125 milligrams of ammonium persulfate were introduced while stirring. The mixture was then heated for 2 hours at 40° C. and for 1 hour at 60° C. After freezing for one day at −20° C. and defrosting the dispersion partially coagulated.

COMPARATIVE EXAMPLE 5 (WITH POLYVINYL SULFONATE)

500 gram of the dispersion according to experiment A were superposed with nitrogen and a solution of 3 grams of poly-sodium vinyl sulfonate in 7 grams of water and 125 milligrams of ammonium persulfate were added while stirring. The mixture was then heated for 2 hours at 40° C. and for 1 hour at 60° C. After freezing for one day at −20° C. and defrosting, the dispersion partially coagulated.

EXAMPLE 2 (ACCORDING TO THE INVENTION)

500 grams of the dispersion according to experiment A were superposed with nitrogen and 125 milligrams of ammonium sulfate and 10 grams of a 30% aqueous sodium vinyl sulfonate solution were added while stirring. The mixture was heated for 2 hours at 40° C. and for one hour at 60° C. When it was frozen for one day at −20° C. and defrosted again the latex viscosity had risen to 1600 poises and the dispersion was free from coagulate.

COMPARATIVE EXAMPLE 6 (WITHOUT VINYL SULFONATE)

The flask contained 1.0 kilogram of an aqueous polyvinyl ester dispersion consisting of—

449 grams of a copolymer of vinyl acetate and isononanoic acid vinyl ester in a ratio of 95:5
41 grams of a polyvinyl alcohol derivative containing in bound form 4 mole percent of acetyl radicals and 2% by weight of acetaldehyde
10 grams of nonyl phenol hydroxyethylated with 30 $C_2H_4O$ groups per molecule
1 gram of sodium lauryl sulfate
2 grams of sodium sulfate and
497 grams of water.

At 20° C. the dispersion had a latex viscosity of 550 poises determined in a Höppler viscosimeter.

When the dispersion was frozen for 24 hours at −20° C. and defrosted again coagulation had occurred.

COMPARATIVE EXAMPLE 7 (WITHOUT VINYL SULFONATE)

200 milligrams of potassium persulfate, 100 milligrams of ascorbic acid and 4 milliliters of water were added to the dispersion specified in Comparative Example 6 and the mixture was stirred for 1 hour at 25° C. and for 1 hour at 45° C. The dispersion was then frozen for 24 hours at −20° C. and defrosted again. It contained a large proportion of coagulated particles.

COMPARATIVE EXAMPLE 8 (MIXTURE OF POLYVINYL ALCOHOL DERIVATIVE AND VINYL SULFONATE HOMOPOLYMER VINYL

A solution of 2 grams of poly-sodium vinyl sulfonate in 4 milliliters of water, 200 milligrams of potassium persulfate and 100 milligrams of ascorbic acid were added to the dispersion specified in Comparative Example 6. The dispersion was stirred for 1 hour at 25° C. and for another hour at 45° C. After freezing and defrosting the dispersion coagulated.

EXAMPLE 3 (ACCORDING TO THE INVENTION)

An aqueous solution of 2 grams of sodium vinyl sulfonate in 4 grams of water, 200 milligrams of potassium persulfate and 100 milligrams of ascorbic acid were added to the dispersion specified in Comparative Example 6 and the dispersion was stirred for 1 hour at 25° C. and for another hour at 45° C. After freezing and defrosting the latex viscosity of the dispersion had risen to 600 poises. It was free from coagulated particles.

What is claimed is:

1. In a process for making aqueous dispersions of polyvinyl esters or copolymers of vinyl esters by polymerizing vinyl esters of a carboxylic acid having from 2 to 18 carbon atoms, and said vinyl ester together with other ethylenically unsaturated compounds selected from the group consisting of an acrylic acid ester of a monohydric saturated aliphatic alcohol of up to 10 carbon atoms, a maleic acid ester of a monohydric saturated aliphatic alcohol of up to 10 carbon atoms, and vinyl chloride in an aqueous emulsion in the presence of a free radical polymerization catalyst and as protective colloids polyvinyl alcohol derivatives selected from a group consisting of hydrolysis products of a polyvinyl ester, a copolymer consisting essentially of a polyvinyl ester, hydrolysis products of a graft polymer of a vinyl ester on a polyalkylene oxide, hydrolysis products of a graft polymer of a vinyl ester on a polymeric N-vinyl-N-alkyl-carboxylic amide, and said hydrolysis products having acetal moieties thereon and wherein said hydrolysis product contains up to about 50 mole percent of acyl groups, the improvement which comprises polymerizing at least one vinyl ester, and said vinyl ester together with said other ethylenically unsaturated compounds, in an aqueous dispersion using a protective colloid prepared by graft-polymerizing a vinyl sulfonate onto said water-soluble polyvinyl alcohol derivative, the vinyl sulfonate graft polymer being obtained by polymerizing from 1 to 300 parts by weight of vinyl sulfonate, when said vinyl sulfonate is calculated on basis of said water-soluble polyvinyl derivative as defined above, and the amount of the vinyl sulfonate graft polymer ranging from 1 to 20% by weight, when calculated on the basis of said vinyl polymer.

2. The process of claim 1, wherein the protective colloid prepared by graft polymerizing a vinyl sulfonate onto said water-soluble polyvinyl alcohol derivative is added to the aqueous dispersion prior to the polymerization of the monomers.

3. The process of claim 1, wherein the polymerization of the monomers is carried out in the presence of said water-soluble polyvinyl alcohol derivative and subsequently the protective colloid is produced by grafting the vinyl sulfonate onto said water-soluble polyvinyl alcohol derivative.

4. The process of claim 1, wherein the protective colloid is a graft polymer obtained by graft-polymerizing sodium vinyl sulfonate onto said water-soluble polyvinyl alcohol derivative.

5. The process of claim 1, wherein the protective colloid is a graft polymer of sodium vinyl sulfonate on a water-soluble hydrolysis product of a polyvinyl ester, a copolymer containing a predominent proportion of a polyvinyl ester or of a graft polymer of a vinyl ester on a polyalkylene oxide or on a polymeric N-vinyl-N-alkyl-carboxylic acid amide.

6. The process of claim 1, wherein the protective colloid is a graft polymer of sodium vinyl sulfonate on a water soluble hydrolysis product of a graft polymer of vinyl acetate on a polyalkylene oxide or a polymeric N-vinyl-N-alkyl-carboxylic acid amide.

7. The process of claim 1, wherein the protective colloid is a graft polymer of sodium vinyl sulfonate on a water-soluble hydrolysis product of polyvinyl acetate.

8. The process of claim 1, wherein the protective colloid is a graft polymer of sodium vinyl sulfonate on a water-soluble polyvinyl alcohol derivative as defined in claim 1, the hydroxyl groups of which derivative are at least partially acetalized by acetaldehyde and/or butyraldehyde.

9. Aqueous dispersions of a polyvinyl ester of a carboxylic acid having from 2 to 18 carbon atoms or a copolymer of a vinyl ester, with other ethylenically unsaturated compounds selected from the group consisting of an acrylic acid ester of a monohydric saturated aliphatic alcohol of up to 10 carbon atoms, a maleic acid ester of a monohydric saturated aliphatic alcohol of up to 10 carbon atoms, and vinyl chloride, and as a protective colloid a polyvinyl alcohol derivative selected from the group consisting of hydrolysis products of a polyvinyl ester, a copolymer consisting essentially of a polyvinyl ester, hydrolysis products of a graft polymer of a vinyl ester on a polyalkylene oxide, hydrolysis products of a graft polymer of a vinyl ester on a polymeric N-vinyl-N-alkyl-carboxylic amide, wherein said hydrolysis products have acetal moieties thereon, said hydrolysis product containing up to about 50 mole percent of acyl groups and further, containing as a protective colloid a graft polymer of a vinyl sulfonate on said water-soluble polyvinyl alcohol derivative, the vinyl sulfonate graft polymer being obtained by polymerizing from 1 to 300 parts by weight of vinyl sulfonate, when said vinyl sulfonate is calculated on basis of said water-soluble polyvinyl derivative as defined above, and the amount of the vinyl sulfonate graft polymer ranging from 1 to 20% by weight, then calculated on the basis of said vinyl polymer.

10. Aqueous dispersions as claimed in claim 9, wherein the protective colloid is a graft polymer of sodium vinyl sulfonate on said water-soluble polyvinyl alcohol derivative.

11. Aqueous dispersions as claimed in claim 9, wherein the protective colloid is a graft polymer of sodium vinyl sulfonate on a water-soluble hydrolysis product of a polyvinyl ester, a copolymer containing predominant proportion of a polyvinyl ester or a graft polymer of a vinyl ester on a polyalkylene oxide or on a polymeric N-vinyl-N-alkyl-carboxylic acid amide.

12. Aqueous dispersions as claimed in claim 9, containing as protective colloid a graft polymer of sodium vinyl sulfonate on a water-soluble hydrolysis product of a graft polymer of vinyl acetate on a polyalkylene oxide or on a polymeric N-vinyl-N-alkyl-carboxylic acid amide.

13. Aqueous dispersions as claimed in claim 9, containing as protective colloid a graft polymer of sodium vinyl sulfonate on a water-soluble hydrolysis product of polyvinyl acetate.

14. Aqueous dispersions as claimed in claim 9, containing as protective colloid a graft polymer of sodium vinyl sulfonate on a water-soluble polyvinyl alcohol derivative the hydroxyl groups of which are at least partially acetalized by acetaldehyde and/or butyraldehyde.

References Cited

UNITED STATES PATENTS

| 3,190,843 | 6/1965 | Höfelmann et al. | 260—29.6BX |
| 3,231,534 | 1/1966 | Blades et al. | 260—875X |
| 3,234,160 | 2/1966 | Matsubayashi | 260—29.6WA |
| 3,301,805 | 1/1967 | Kahrs et al. | 260—29.6WA |

FOREIGN PATENTS

| 1,214,404 | 4/1966 | Germany | 260—875 |

MURRAY TILLMAN, Primary Examiner

H. ROBERTS, Assistant Examiner

U.S. Cl. X.R.

117—148, 155; 260—875, 876